Oct. 27, 1942.　　　L. O. CARLSEN　　　2,300,340
MACHINE FOR PRODUCING GEARS
Filed June 1, 1940　　　3 Sheets-Sheet 1

Inventor
LEONARD O. CARLSEN
By
Attorney

Inventor
LEONARD O. CARLSEN

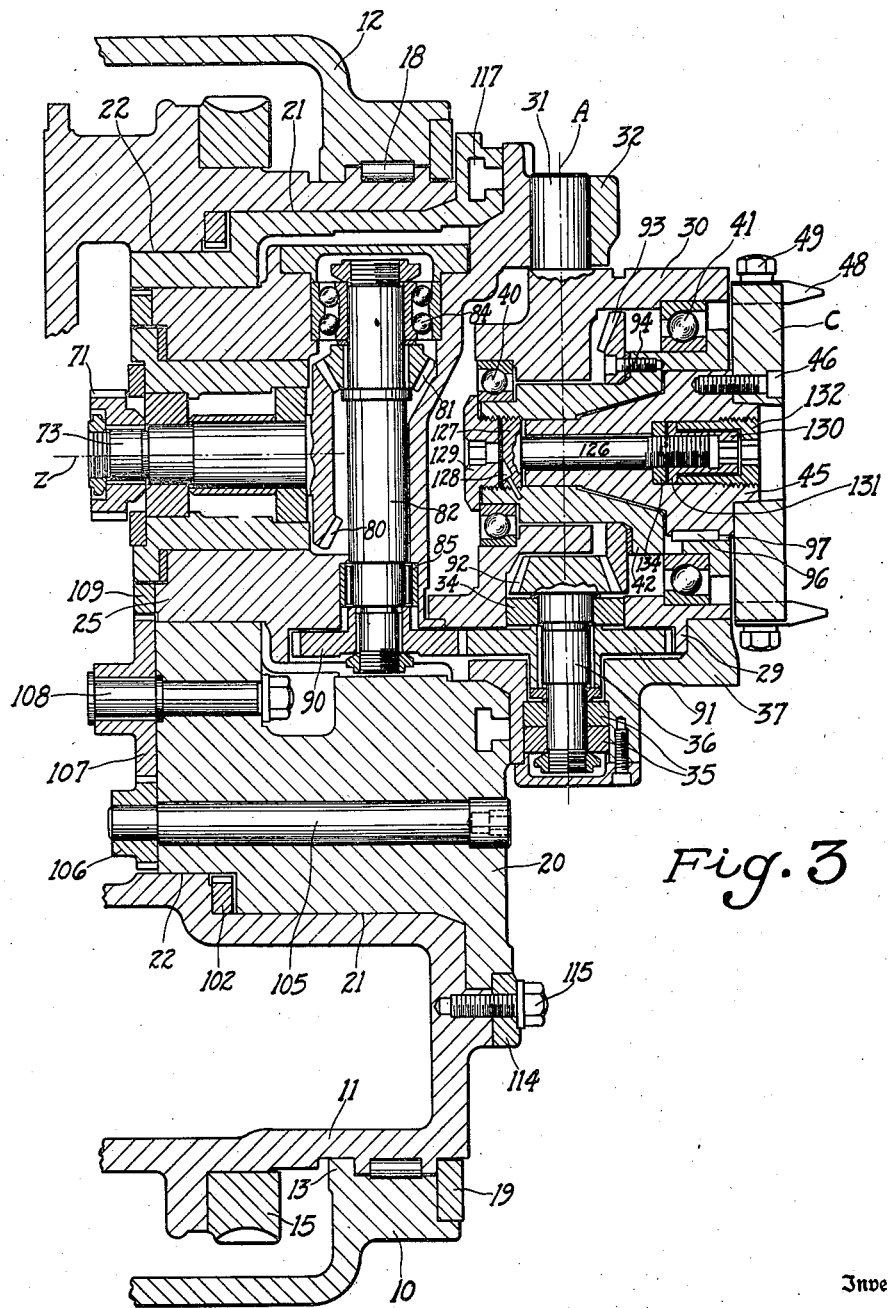

Patented Oct. 27, 1942

2,300,340

UNITED STATES PATENT OFFICE 2,300,340

MACHINE FOR PRODUCING GEARS

Leonard O. Carlsen, Rochester, N. Y., assignor to Gleason Works, Rochester, N. Y., a corporation of New York Application June 1, 1940, Serial No. 338,357

6 Claims. (Cl. 90—5)

The present invention relates to machines for producing gears and particularly to machines for generating longitudinally curved tooth bevel and hypoid gears with a face-mill type of gear cutter.

In the more universal type of machine for generating longitudinally curved tooth bevel and hypoid gears with a face-mill type of cutter, it is customary to provide two angular adjustments for the cutter besides the adjustments required for spiral angle of the gear to be produced. These two angular adjustments give general control of the tooth bearing and pressure angle of the gear to be produced, enable gears to be generated conjugate either to a crown gear or to a mate non-generated gear, and permit of using a single cutter to cut gears of different pressure angles. The universal type spiral bevel and hypoid machines heretofore built, however, have been limited in the amount of adjustment of the cutter that could be obtained. Difficulty has been experienced, for instance, in securing sufficient adjustment to cut gears of zero or low spiral angle such as are now being used extensively in the aeroplane industry. Moreover, with prior universal type machines it has not been practical to cut pinions of very low numbers of teeth or the generated member of a pair of miter gears or near miters in which one member is non-generated. Further than this, in the universal type machines heretofore built, slides or carriages have been employed for the purpose of adjustment, and sliding or telescoping shafts have been required in the drive to the cutter.

One object of the present invention is to provide a universal type machine for generating longitudinally curved tooth bevel and hypoid gears in which the cutter mounting and drive will be much more rigid than in similar prior type machines. To this end, it is a further purpose of the invention to provide a machine of the type described in which the drive to the cutter is secured without use of sliding or telescoping shafts.

A further object of the invention is to provide a machine of the type described in which the cutter is so mounted as to have sufficient adjustment to cut any job otherwise within the range of the machine.

A still further object of the invention is to provide a machine of the type described in which the cutter mounting and drive besides having the desired range of adjustment and rigidity will be very compact and will require fewer parts than in prior universal type machines.

Other objects of the invention will be apparent hereinafter from the specification and from the recital of the appended claims.

As in previous machines of this type, the cutter is mounted in the present machine on an oscillatory cradle which is rotated in time with the rotation of the work spindle to effect the generating roll. In the preferred construction according to the present invention, the cutter spindle is journaled in a housing that is mounted on a swivel bracket for pivotal adjustment through a very wide angle about an axis extending at right angles to the axis of the cutter spindle. The swivel bracket is, in turn, mounted on a carrier for adjustment through an angle of 360° about an axis extending at right angles to the axis of adjustment of the cutter housing. The carrier, in turn, is mounted in the cradle for adjustment through an angle of 360° about an axis which is parallel to the axes of both the swivel bracket and the cradle but offset from both these axes. The cradle itself, as in prior type machines, is adjustable on the frame of the machine about its own axis through an angle of 360°. The cutter, instead of being mounted directly on the cutter spindle as in known machines, is secured to a support that is adjustable in the cutter spindle axially of that spindle. This adjustment is to enable compensation to be made for the change in height of the blades of the cutter after sharpening and to permit use of different sizes of cutters. The drive to the cutter is obtained through a shaft mounted coaxially of the cradle, a shaft parallel thereto and mounted coaxially of the carrier, a shaft parallel to the first two shafts and mounted coaxially of the swivel bracket, a shaft perpendicular to the last-named shaft and journaled in the swivel bracket, a shaft parallel to the last-named shaft and mounted concentrically of the pivotal center of the cutter housing, appropriate gearing connecting the several shafts to one another, and a pair of bevel gears which connect the last-named shaft with the cutter spindle. No sliding or telescoping shafts are required or used.

In the drawings:

Fig. 3 is a somewhat enlarged sectional view through the cradle taken in a different plane from the view of Fig. 2 and showing the cutter swivel bracket and the parts carried thereby in positions at right angles to the positions they occupy in Fig. 2.

Figure 1:
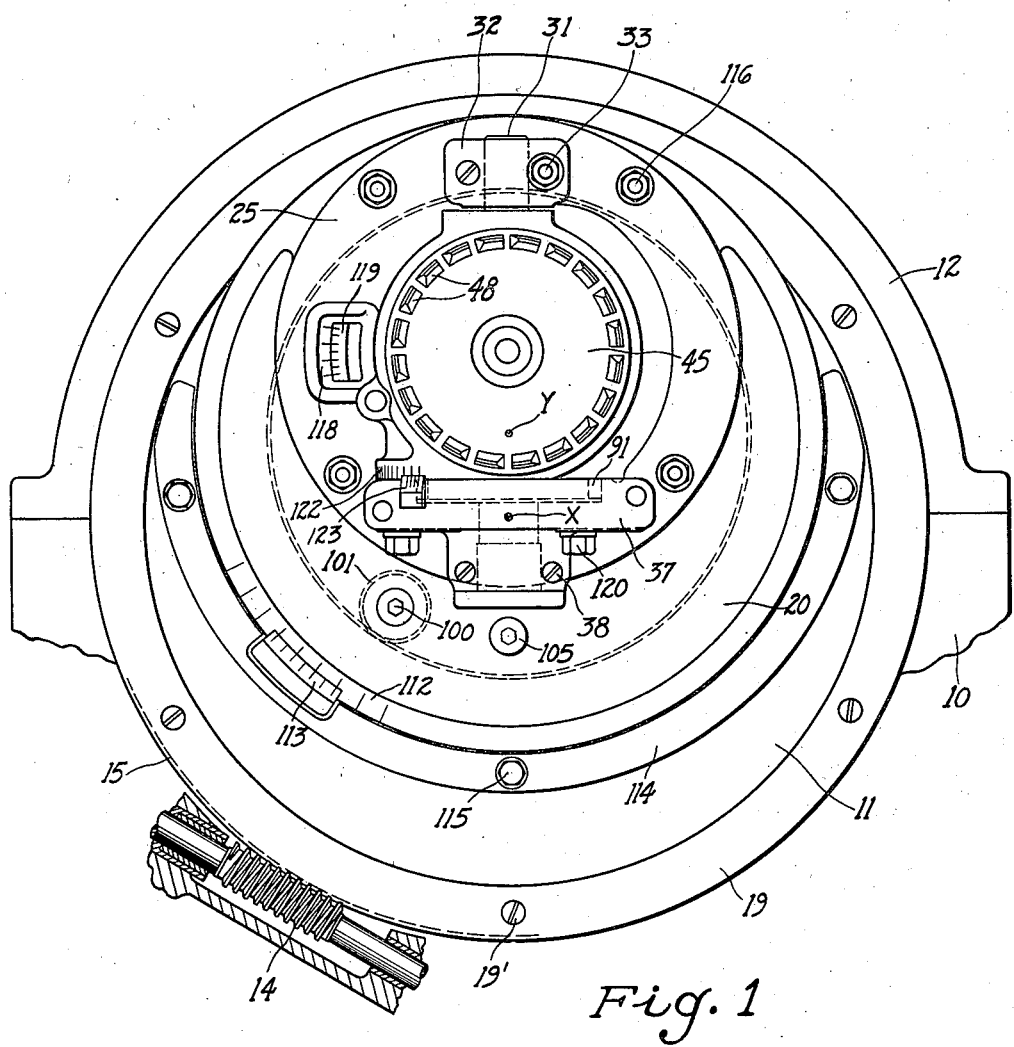
Fig. 1 is a fragmentary elevational view looking at the front end of the cradle of a machine built according to one embodiment of this invention.

In the drawings, 10 denotes the base or frame of the gear cutting machine and 11 designates the cradle. The cradle is a full circular cradle. It is journaled in a semi-circular bearing formed in the frame 10 and is held therein by the semi-circular cap-member 12 which is secured in any suitable manner to the frame 10. The cradle is mounted on a plain bearing 17 and on roller bearings 18. The latter are mounted in the full circular raceway formed in the frame 10 and cap 12. The cradle is held against axial movement by a shoulder 13 that is formed on the frame and by a circular gib 19 that is secured to the frame by screws 19'. The cradle is adapted to be driven by a worm 14 in time with the rotation of the work spindle of the machine to effect the generating roll. This worm meshes with a worm wheel 15 which is secured by bolts or screws 16 (Fig. 2) to the cradle.

Mounted in the cradle for rotatable adjustment therein about an axis Y (Figs. 1 and 2), which is eccentric of the axis X of the cradle, is a cutter carrier 20. This cutter carrier is journaled in the cradle on spaced plain bearing surfaces 21 and 22.

Journaled in the cutter carrier 20 for rotatable adjustment therein through an angle of 360° about an axis Z (Fig. 2), which is eccentric of the axis Y of the cutter carrier, is a swivel bracket 25. This swivel bracket is mounted on spaced plain bearing surfaces 26 and 27 in the carrier.

Mounted on the swivel bracket 25 for angular adjustment thereon is a cutter housing 30. This housing is formed with an integral trunnion 31 and with an aligned cylindrical collar portion 29. The trunnion fits into a half round bearing formed on the front end of the swivel bracket 25 and is held in that bearing by a cap member 32 that is secured to the front face of the swivel bracket by bolts or screws 33. The collar portion 29 is of considerably larger diameter than the trunnion 31. It fits into a half-round bearing formed on the front end of the swivel bracket 25 and is held in that bearing by a cap member 37.

Journaled on spaced anti-friction bearings 34 and 35 (Fig. 3) is a shaft 36 which is axially aligned with the trunnion 31. The bearing 34 is secured in the cutter housing 30 while the bearings 35 are held by a cap member 37 in a half round bearing, which is formed in the front face of the swivel bracket 25. The cap member 37 is secured to the front face of the swivel bracket 25 by screws 38. The housing 30 is pivotally adjustable on the swivel bracket 25 about the axis A of the trunnion 31 and collar 29.

Journaled in the cutter spindle housing 30 on spaced anti-friction bearings 40 and 41 is the cutter spindle 42. The axis of this spindle extends at right angles to the axis A of the trunnion 31 and shaft 36.

The cutter spindle 42 is formed with a centrally disposed bore and mounted in this bore for sliding adjustment therein in a direction axial of the cutter spindle is a cutter support 45. The cutter C, which may be a face-mill gear cutter of any suitable construction, is secured to the nose of the cutter support 45 by screws 46. It is provided with a plurality of cutting blades 48 which project axially beyond the outer face of the cutter and are secured to the cutter by screws 49.

During the operation of the machine, the cutter is intended to rotate continuously. It may be driven from a motor 50 (Fig. 2) which may be mounted at any convenient point on the machine. In the instance illustrated, there is a shaft 51 which is coupled to the armature shaft of the motor and which carries at its outer end a spur gear 52. This spur gear meshes with a spur gear 53 which is secured to a shaft 54. Fastened to this shaft 54 is a bevel gear 55 which meshes with a bevel gear 56 that is secured to a shaft 57. The shaft 57 is journaled on anti-friction bearings 58 and 59 in the cradle to be coaxial of the axis X of the cradle. Keyed to the inner end of the shaft 57 is a spur pinion 60. This pinion 60 meshes with a spur gear 61 which is keyed to a shaft 62. The shaft 62 is mounted coaxially of the axis Y of the eccentric carrier 20 and is journaled on spaced anti-friction bearings 63 and 64 in a bracket 65 which is secured by screws 66 to the cradle.

Integral with the shaft 62 is a spur pinion 70. This pinion meshes with a spur gear 71 which is keyed to a shaft 73. The shaft 73 is mounted coaxially of the axis Z of the swivel bracket 25 and is journaled on spaced anti-friction bearings 74 and 75 in a sleeve member 76. The sleeve member 76 is secured by screws 77 to the swivel bracket 25.

Integral with the shaft 73 is a bevel gear 80. This bevel gear meshes with a bevel pinion 81 (Fig. 3) which is keyed to a shaft 82 that extends at right angles to the shaft 73 and that is journaled on anti-friction bearings 84 and 85 in the swivel bracket 25. A spur gear 90, which has splined engagement with the shaft 82, is mounted on the lower end of the shaft and meshes with a spur gear 91 which has splined engagement with the shaft 36. The collar 29 is cut away around part of its periphery for part of its height to make room for the spur gears 90 and 91.

Integral with the shaft 36 is a bevel pinion 92. This pinion meshes with a bevel gear 93 which is secured by screws 94 to the cutter spindle 42. The cutter support 45 is rotatably connected to the cutter spindle 42 by a key 96 which is adapted to slide in an elongated slot 97 formed in the cutter spindle. Thus, the cutter may be driven in any position of its adjustment.

Figure 2:
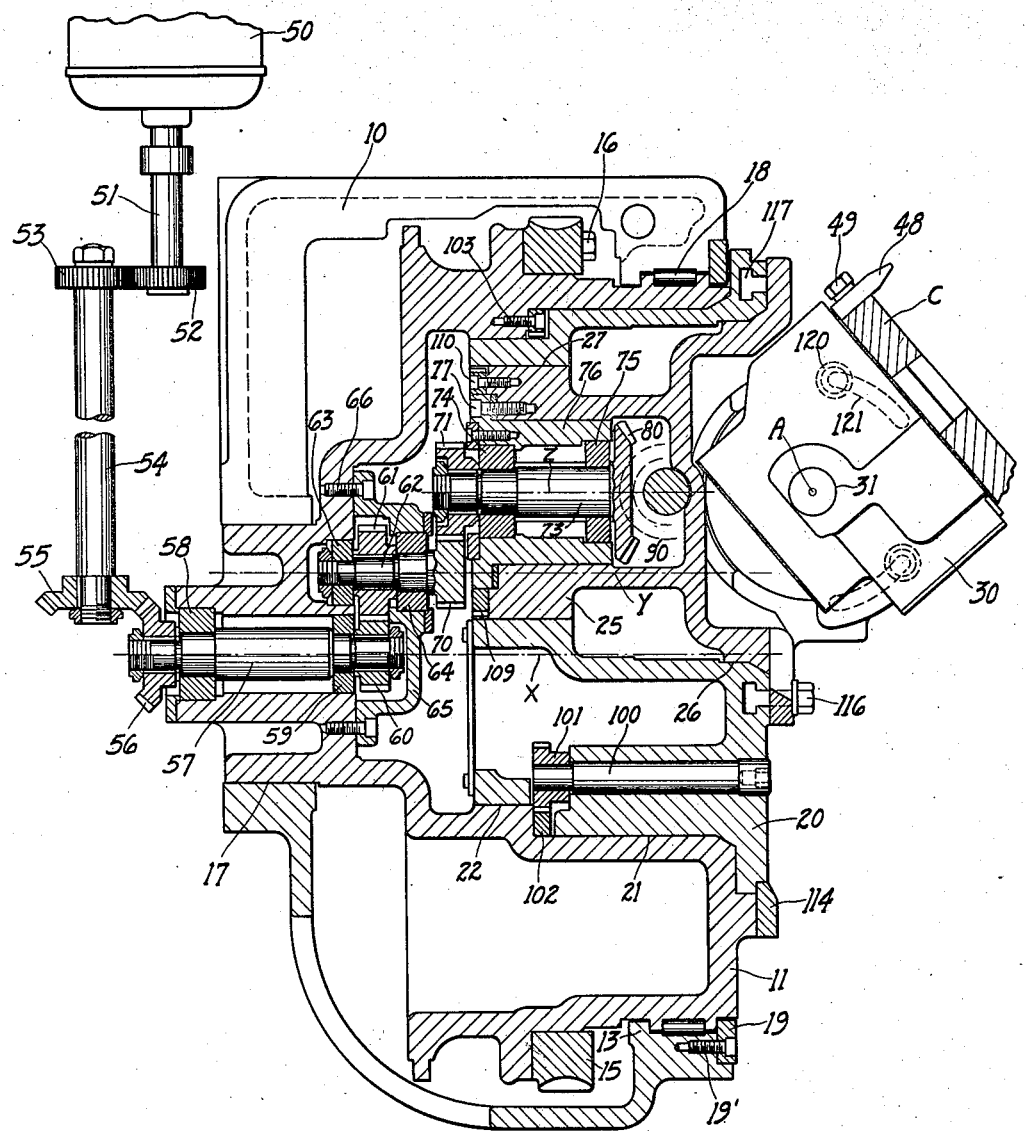
Fig. 2 is a sectional view through the cradle of this machine showing, in particular, details of the cutter mounting and of the cutter drive.

The cradle 11 can be adjusted angularly in the frame 10 by manual rotation of the worm 14 according to usual practice in machines of the type described. For the purpose of making this adjustment precisely, the gib 19 may be suitably graduated. The eccentric carrier 20 may be adjusted angularly in the cradle 11 by manual rotation of a shaft 100 (Fig. 2). Keyed to this shaft at its rear end is a spur pinion 101 which meshes with an internal gear 102 that is secured by screws 103 to the cradle 11. The gear 102 is mounted coaxial of the axis Y of the carrier. The adjustment of the carrier 20 on the cradle 11 can be effected precisely by use of the scale 112 and vernier 113 (Fig. 1) and the carrier may be secured to the cradle in any adjusted position by the gib 114 and screws 115. The scale 112 is formed on the carrier 20 and the vernier is secured to the gib 114 mounted on the face of the cradle. By adjustment of the carrier 20 in the cradle 11, the radial position of the cutter relative to the axis X, the cradle can be controlled and by adjustment of the cradle on the frame the angular position of the cutter about the axis of the cradle can be adjusted, so that the cutter can be positioned in accordance with the spiral angle and hand of the gear to be cut.

The angular position of the swivel bracket 25 in the eccentric carrier 20 can be adjusted by manual rotation of the shaft 105 (Fig. 3) which is journaled in the carrier 20 and has keyed to its rear end a spur pinion 106. The pinion 106 meshes with an intermediate idler gear 107 that is journaled on a stub shaft 108 which is held in the carrier 20. The gear 107 meshes with a spur gear 109 which is secured to the swivel bracket 25 by screws 110 (Fig. 2). The gear 109 is coaxial of the swivel bracket. A scale 118, that is secured to the carrier 20, and a vernier 119, that is secured to the swivel bracket 25, are provided to permit of precise adjustment of the swivel bracket in the carrier. The swivel bracket 25 is secured in any adjusted position on the carrier 20 by T-bolts 116 (Fig. 1) which engage in the circular T-slot 117 (Fig. 2) that is formed in the front face of the carrier 20.

The cutter housing 30 may be manually adjusted about the axis A and is adapted to be secured in any adjusted position by bolts 120 (Fig. 1) which engage in arcuate slots 121 (Fig. 2) formed in the cover plate 37 concentric with the axis A. A scale 122 on the outside of the housing (Fig. 1) and a vernier 123, which is secured to the cover-plate 37, permit this adjustment to be made precisely.

The angular adjustments of the swivel bracket on the eccentric carrier and of the housing on the swivel bracket permit of tilting the cutter with reference to the work and of adjusting the tilted cutter into different planes about the axis of the cradle. Thus the cutter may be adjusted to cut gears of different pressure angles, to suitably control the tooth bearing of the gear to be produced, and to generate that gear conjugate to a basic gear of any desired cone angle. By use of a swivel bracket that is adjustable through 360° it is possible to cut all jobs within the range of the machine with the housing adjusted in one direction about the axis A. This is a great convenience.

To compensate for change in height of the cutter blades after sharpening or to accommodate different sizes of cutters, and to maintain the tip cutting edges of the cutter always at the same distance from the axis A so that the cutter tips may always be positioned in the correct plane, the cutter support 45 is axially adjusted in the cutter spindle. For this purpose, there is a stud 126 (Fig. 3) secured centrally in aligned bores formed in the cutter spindle 42 and cutter support 45. This stud has an enlarged head 127 at its rear end which is externally threaded to thread into the bore of the spindle. The stud is secured against movement relative to the spindle, however, by a set screw 128. A nut 129 serves to hold the ball bearing 40 in position and close the rear end of the spindle.

The stud 126 is threaded at its forward end and a thimble 130 is threaded onto this end of the stud. This thimble is provided with a circular flange 131 at its rear end which is held between a nut 134, that is keyed to the thimble 130, and a sleeve member 132, that threads into the bore of the cutter support 45. The cutter support can be adjusted axially in the cutter spindle 42 by inserting a suitable tool through a suitable opening in the sleeve member 132 to loosen the sleeve member, and then inserting the tool into a recess formed in the thimble 130 and rotating the thimble and nut 134 to thread the thimble and nut together along the forward end of the stud 126, thereby moving the cutter support axially of the stud and of the cutter spindle. After adjustment, the sleeve member 132 is threaded up again to lock thimble 130 and nut 134 in adjusted position.

From the preceding description, it will be seen that a very rigid mounting is provided for the cutter despite the numerous adjustments possible. It will be further seen that the drive to the cutter is obtained without the use of any telescoping or sliding shaft whatsoever. A machine built according to the present invention, then, will have a very wide range of adjustment and yet have a very rigid and compact cutter mounting.

While the invention has been described in connection with a machine employing a face-mill cutter as the cutting tool, it will be understood that it is equally applicable to a machine employing a rotary annular grinding wheel as the cutting tool, and where the term "cutting" and "cutter" is used in the claims it is to be understood that those terms are intended to cover grinding and grinding wheels.

In general it may be said that while the invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for producing gears, a frame, a cradle journaled in the frame, a carrier rotatably adjustable in the cradle about an axis parallel to but offset from the axis of the cradle, a swivel bracket rotatably adjustable in the carrier about an axis parallel to but offset from the axis of the carrier, a housing mounted in the swivel bracket for adjustment about an axis which is angularly disposed to the axis of adjustment of the swivel bracket, a cutter spindle journaled in the housing, means for rotating the cradle and means for rotating the cutter spindle.

2. In a machine for producing gears, a frame, a cradle journaled in the frame and rotatably adjustable thereon through an angle of 360°, a carrier journaled in the cradle for adjustment through an angle of 360° about an axis parallel to but offset from the axis of the cradle, a swivel bracket journaled in the carrier for adjustment through an angle of 360° about an axis parallel to but eccentric of the axis of the carrier, a housing mounted on the swivel bracket for adjustment thereon about an axis perpendicular to the axis of adjustment on the swivel bracket, a cutter spindle journaled in the housing for rotation about an axis perpendicular to the axis of adjustment of the housing, a support for a face-mill cutting tool mounted in the spindle for adjustment in a direction axial of the spindle, means securing the support to the spindle to rotate therewith, means for rotating the cradle, and means for rotating the cutter spindle.

3. In a machine for producing gears, a frame, a circular cradle rotatably mounted on the frame and adjustable thereon through an angle of 360°, a tool support mounted on the cradle for adjustment about an axis parallel to but eccentric of the axis of the cradle and about two axes perpendicular to one another, said tool support being adapted to have a face-mill gear cutter secured thereto to rotate therewith, means for rotating the cradle, and means for rotating the tool support.

4. In a machine for producing gears, a frame, a circular cradle rotatably mounted on the frame and adjustable thereon through an angle of 360°, a carrier journaled in the cradle and rotatably adjustable thereon about an axis parallel to but eccentric of the axis of the cradle, a swivel head journaled in the carrier and adjustable thereon about an axis parallel to but eccentric of the axis of the carrier, a housing mounted on said swivel head for adjustment about an axis perpendicular to the axis of adjustment of said swivel bracket, a cutter spindle journaled in said housing, and means for driving said cutter spindle comprising a shaft journaled in the cradle coaxial of the cradle, a shaft journaled in the cradle coaxially of said carrier, means for driving the second shaft from the first-named shaft, a shaft journaled in said housing coaxially of said housing, means for driving said last-named shaft from the second shaft, and means for driving the cutter spindle from the last-named shaft.

5. In a machine for producing gears, a frame, a circular cradle rotatably mounted in the frame and adjustable thereon through an angle of 360°, a carrier journaled in the cradle and rotatably adjustable thereon about an axis parallel to but eccentric of the axis of the cradle, a swivel bracket journaled in the carrier and rotatably adjustable thereon about an axis parallel to but eccentric of the axis of the carrier, a housing mounted on said swivel bracket for adjustment about an axis perpendicular to the axis of the swivel bracket, a cutter spindle journaled in the housing, a cutter support mounted in the spindle for adjustment axially of the spindle but secured to the spindle to rotate therewith, and means for driving the cutter support comprising a shaft journaled in the swivel bracket coaxially of said bracket, a shaft journaled in the swivel bracket at right angles thereto, gearing connecting the two shafts, a third shaft journaled in the housing parallel to the second shaft, gearing connecting the third and second shafts, a bevel gear secured to the third shaft, and a bevel gear secured to the cutter spindle.

6. In a machine for producing gears, a frame, a circular cradle rotatably mounted in the frame and adjustable thereon through an angle of 360°, a carrier journaled in the cradle and rotatably adjustable therein through an angle of 360° about an axis parallel to but eccentric of the axis of the cradle, a swivel bracket journaled in the carrier and adjustable thereon through an angle of 360° about an axis parallel to but eccentric of the axis of the carrier, a housing mounted on the swivel bracket for adjustment about an axis perpendicular to the axis of the swivel bracket, a cutter spindle journaled in the housing, a support mounted on the cutter spindle for adjustment axially thereof but connected to the spindle to rotate therewith, and means for driving the cutter support comprising a shaft journaled in the cradle coaxially thereof, a second shaft journaled in the cradle coaxially of the carrier, spur gearing connecting the two shafts, a third shaft journaled in the swivel bracket coaxially thereof, spur gears connecting the second and third shafts, a fourth shaft journaled in the swivel bracket at right angles to the third shaft, means for driving the fourth shaft from the third shaft, a fifth shaft journaled in the housing coaxially of the axis of adjustment of the housing, spur gearing connecting the fourth and fifth shafts, a bevel gear secured to the fifth shaft, and a bevel gear secured to the cutter spindle.

LEONARD O. CARLSEN.